United States Patent [19]

Kouno et al.

[11] Patent Number: 4,772,249
[45] Date of Patent: Sep. 20, 1988

[54] HYDRAULIC CONTROL SYSTEM FOR CONTINUOUSLY VARIABLE TRANSMISSION FOR AUTOMOTIVE VEHICLE

[75] Inventors: Katsumi Kouno, Susono; Susumu Okawa, Aichi; Masami Sugaya; Yoshinobu Soga, both of Susono, all of Japan

[73] Assignee: Toyota Jidosha Kabushiki Kaisha, Aichi, Japan

[21] Appl. No.: 16,635

[22] Filed: Feb. 19, 1987

[30] Foreign Application Priority Data

Feb. 22, 1986 [JP] Japan .................................. 61-37574
Feb. 22, 1986 [JP] Japan .................................. 61-37576

[51] Int. Cl.$^4$ ............................................ F16H 11/02
[52] U.S. Cl. ........................................ 474/28; 74/868
[58] Field of Search ............... 474/18, 28; 74/867, 74/868

[56] References Cited

U.S. PATENT DOCUMENTS

| | | | |
|---|---|---|---|
| 3,600,960 | 8/1971 | Karig et al. | 474/28 X |
| 4,557,706 | 12/1985 | Tanaka et al. | 474/28 |
| 4,627,313 | 12/1986 | Sakai | 474/28 X |
| 4,628,773 | 12/1986 | Itoh et al. | 474/28 X |
| 4,669,336 | 6/1987 | Okada et al. | 474/28 X |

FOREIGN PATENT DOCUMENTS

| | | |
|---|---|---|
| 063786 | 4/1982 | European Pat. Off. |
| 151535 | 1/1984 | European Pat. Off. |
| 168540 | 12/1984 | European Pat. Off. |
| 2703487 | 1/1977 | Fed. Rep. of Germany |
| 2946295 | 11/1979 | Fed. Rep. of Germany |
| 52-98861 | 8/1977 | Japan |
| 58-29424 | 6/1983 | Japan |

*Primary Examiner*—Thuy M. Bui
*Attorney, Agent, or Firm*—Parkhurst & Oliff

[57] ABSTRACT

A hydraulic control system for a continuously variable transmission for an automotive vehicle, the transmission having a first and a second variable-diameter pulley provided on respective first and second shafts, a belt connecting the first and second pulleys, and a first and a second hydraulic cylinder for changing effective diameters of the first and second pulleys. The control system includes a shift-control valve receiving a first line pressure from said pressure source to one of the cylinders, while simultaneously permitting a flow of the fluid from the other cylinder. A second pressure line is connected to the shift-control valve to receive therefrom a pressure of the fluid flowing from above-indicated other cylinder. A pressure regulating valve regulates the pressure in the second pressure line, as a second line pressure lower than said first line pressure. The control system further includes at least one one-way by-pass line or restricted by-pass line which connects the second pressure line to at least one of the two cylinders, respectively. Each by-pass line permits a flow of the fluid from the second pressure line to the corresponding cylinder, or a restricted flow of the fluid between the second pressure line and the hydraulic cylinder.

4 Claims, 14 Drawing Sheets

HYDRAULIC CONTROL SYSTEM FOR CONTINUOUSLY VARIABLE TRANSMISSION FOR AUTOMOTIVE VEHICLE

BACKGROUND OF THE INVENTION

1. Field of the Invention

The present invention relates to improvements in a hydraulic control system for a continuously variable transmission of a belt-and-pulley type for an automotive vehicle.

2. Discussion of the Related Art

A belt-and-pulley type of continuously variable transmission for an automotive vehicle is known. This transmission includes a first shaft, a second shaft, a first variable-diameter pulley provided on the first shaft, a second variable-diameter pulley provided on the second shaft, a transmission belt connecting the first and second pulleys to transmit power from the first shaft to the second shaft, a first hydraulic cylinder for changing an effective diameter of the first pulley, and a second hydraulic cylinder for changing an effective diameter of the second pulley. An example of a hydraulic control system for controlling the speed ratio and belt tension of this type of continuously variable transmission is disclosed in Publication No. 58-29424 (published in 1983 for opposition purpose) of Japanese Patent Application, wherein a shift-control valve (four-way valve) is provided for feeding a pressurized working fluid from a hydraulic pressure source to one of the two hydraulic cylinders and allowing the fluid to be discharged from the other cylinder. The control system further uses a solenoid-operated relief valve (pressure regulating valve) for regulating the pressure of the fluid which is delivered from the shift-control valve.

In the hydraulic control system indicated above, a comparatively high pressure generated by the pressure source is applied to the hydraulic cylinder for the pulley provided on the drive shaft, i.e., to one of the two cylinders which is subject to a relatively high pressure during power transmission in the direction from the drive shaft to the driven shaft of the transmission. The other cylinder is supplied with the pressure which is regulated by the pressure regulating valve. According to this arrangement, the belt tension and the speed ratio of the transmission can be suitably controlled, even when the direction of power transmission is reversed.

3. Problems Solved by the Invention

In the continuously variable transmissions as discussed above, the working fluid usually leaks to some extent through hydraulically operated members such as the hydraulic cylinders. The rate of leak flows of the fluid from the cylinders may increase to an abnormal level when the fluid temperature is elevated, or if the sealing members for the cylinders are deteriorated, or if foreign matters enter the hydraulic system. In this event, the pressure in the low-pressure cylinder provided on the driven shaft of the transmission may fall below a lower limit necessary to maintain a minimum required tension of the transmission belt. In this case, therefore, the belt may slip on the pulleys, leading to reduced durability of the continuously variable transmission.

Further, the conventional transmissions require complicated control formulas for controlling the pressure regulating valve to regulate the pressure of the fluid which flows from the low-pressure cylinder to the shift-control valve. Moreover, the pressure regulating valve is uncapable of exact or accurate control of the pressure. Stated more specifically referring to FIG. 4, there exists a pressure difference ($\Delta P2$ in the figure) between the pressure (second line pressure Pl2 in the figure) established by the pressure regulating valve by controlling the pressure of the fluid which is discharged from the low-pressure cylinder and returned to the shift-control valve, and the pressure (Pin or Pout in the figure) in the low-pressure cylinder, while the shift-control valve is placed near its neutral position. Therefore, the control value or signal for controlling the pressure regulating valve to regulate the pressure of the fluid discharged from the low-pressure cylinder must be compensated for the above pressure difference, which must be calculated by using a suitable equation. Since the equation for accurate calculation of the pressure difference is very much complicated, the difference is usually obtained by approximation by using a relatively simple equation. This results in accordingly inaccurate compensation for the actually existing pressure difference. Even if the pressure difference can be obtained accurately, there exists a difference in operating characteristics of the individual pressure regulating valves. For these reasons, the pressure of the fluid discharged from the low-pressure cylinder cannot be optimally controlled by the pressure regulating valve.

SUMMARY OF THE INVENTION

It is accordingly an object of the present invention to provide a hydraulic control system for a continuously variable transmission for an automotive vehicle, which is capable of maintaining a suitable tension of the transmission belt, and easily controlling a pressure regulating valve to exactly regulate the pressure of the fluid discharged from the low-pressure cylinder.

The above object may be achieved according to the present invention, which provides a hydraulic control system for a continuously variable transmission of a belt-and-pulley type for an automotive vehicle, the transmission having a first and a second shaft, a first and a second variable-diameter pulley provided on the first and second shafts, respectively, a transmission belt connecting the first and second pulleys to transmit power from one of the pulleys to the other, and a first and a second hydraulic cylinder for changing effective diameters of the first and second pulleys, the hydraulic control system comprising (1) a hydraulic pressure source for pressurizing a working fluid, (2) a shift-control valve disposed between the pressure source and the hydraulic cylinders, (3) a pressure line connected to the shift-control valve, (4) a pressure regulating valve connected to the pressure line, and (5) at least one one-way by-pass line which connects the pressure line to at least one of the first and second hydraulic cylinders, respectively. The shift-control valve is adapted to receive a first line pressure from the pressure source through a first pressure line, and applying the first line pressure to one of the first and second hydraulic cylinders, while simultaneously permitting a flow of the fluid from the other hydraulic cylinder, thereby changing the effective diameters of the first and second pulleys to control a speed ratio of the transmission. The second pressure line receives from the shift-control valve a pressure of the fluid flowing from the other hydraulic cylinder. The pressure regulating valve regulates the pressure in the second pressure line, as a second line pressure lower than the first line pressure. The at least one one-way by-pass line permits a flow of the fluid from the second pressure line to the at least one hydraulic cylinder.

In the hydraulic control system of the present invention constructed as described above, the second line pressure established by the pressure regulating valve is applied through the appropriate one-way by-pass line to the above-indicated other cylinder, that is, to the low-pressure cylinder on the driven shaft in the event that the amount of leak flow of the fluid from that cylinder into the drain exceeds the nominal value due to high temperature of the fluid, deterioration of the sealing members for the cylinder, or entry of foreign matters into the fluid. Therefore, the pressure in the low-pressure cylinder will not fall below the predetermined lower limit necessary to maintain a suitable tension of the transmission belt. Thus, the present hydraulic control system eliminates otherwise possible insufficiency of the belt tension due to an abnormally increased amount of leak flow of the fluid from the low-pressure cylinder, thereby preventing a consequent slip of the transmission belt on the pulleys, and consequent reduction in the durability of the transmission.

According to another aspect of the invention, there is provided a hydraulic control system for a continuously variable transmission of a belt-and-pulley type for an automotive vehicle, the transmission having a first and a second shaft, a first and a second variable-diameter pulley provided on the first and second shafts, respectively, a transmission belt connecting the first and second pulleys to transmit power from one of the pulleys on the other, and a first and a second hydraulic cylinder for changing effective diameters of the first and second pulleys, the hydraulic control system comprising (1) a hydraulic pressure source for pressurizing a working fluid, (2) a shift-control valve disposed between the pressure source and the hydraulic cylinders, (3) a second pressure line connected to the shift-control valve, (4) a pressure regulating valve connected to the second pressure line, (5) at least one one-way by-pass line which connects the second pressure line to at least one of the first and second hydraulic cylinders, respectively, and (6) at least one restricted leak line. The shift-control valve is adapted to receive a first line pressure from the pressure source through a first pressure line, and applying the first line pressure to one of the first and second hydraulic cylinders, while simultaneously permitting a flow of the fluid from the other hydraulic cylinder, thereby changing the effective diameters of the first and second pulleys to control a speed ratio of the transmission. The second pressure line receives from the shift-control valve a pressure of the fluid flowing from the other hydraulic cylinder. The pressure regulating valve regulates the pressure in the second pressure line, as a second line pressure lower than the first line pressure. The at least one one-way by-pass line permits a flow of the fluid from the second pressure line to the at least one hydraulic cylinder. Each of the at least one restricted leak line is connected to corresponding one of the at least one hydraulic cylinder connected to the at least one one-way by-pass line. Each restricted leak line permits a leak flow of the fluid from the corresponding one hydraulic cylinder to a drain.

The hydraulic control system according to the above aspect of the invention provides the same advantage as the system described above, since the second line pressure is applied to the low-pressure cylinder through the appropriate one-way by-pass line, if the amount of the leak flow of the fluid from the low-pressure cylinder exceeds the nominal value.

Further, the at least one restricted leak line permits a predetermined amount of leak flow of the fluid into the drain from the low-pressure cylinder which is necessarily connected to the one-way by-pass line. This arrangement lowers the output pressures of the shift-control valve. When the pressure in the low-pressure cylinder falls below the second line pressure established by the pressure regulating valve, the second line pressure is applied to that cylinder through the one-way by-pass line. Hence, the pressure in the low-pressure cylinder (on the driven shaft) will not be lowered below the second line pressure. In other words, there arises no pressure difference between the pressure in the low-pressure cylinder, and the second line pressure. This simplifies the control of the pressure regulating valve to regulate the pressure in the low-pressure cylinder. Namely, the provision of the at least one by-pass line and the at least one restricted leak line eliminate otherwise required data map or equations for calculating the above-indicated pressure difference, and eliminate calculating operations to make compensation for the pressure difference.

The restricted leak line or lines may be provided by a conduit or conduits which are connected to the respective cylinders and are provided with suitable restrictors. Alternatively, the leak lines may be leak passages which inherently exist at the sliding members of the cylinders to shift the movable rotors of the pulleys.

According to one advantageous feature of the above aspect of the invention, the at least one one-way by-pass line consists of a first and a second by-pass line which are connected between the second pressure line, and corresponding conduits connecting the first and second hydraulic cylinders to the shift-control valve, and the at least one restricted leak line consists of a first and a second leak lines connected to the first and second hydraulic cylinders, respectively. In this case, the advantages mentioned above may be enjoyed, irrespective of the direction in which power is transmitted through the transmission, namely, irrespective of a running condition of the vehicle: a positive-torque state (in which a torque is transmitted from the engine to the drive wheels of the vehicle), or an engine-brake state (in which a torque is transmitted from the drive wheels to the engine).

In one form of the above feature of the invention, the input shaft is connected to the vehicle engine, and the first leak line connected to the first cylinder has a larger degree of flow restriction than the second leak line.

According to another feature of the same aspect of the invention, the input shaft is also connected to the vehicle engine. The at least one one-way by-pass line consists of a single by-pass line which is connected between the second pressure line, and a conduit connecting the other hydraulic cylinder to the shift-control valve, and the at least one restricted leak line consists of a single leak line connected to the second hydraulic cylinder. In this case, the advantages of the invention can be enjoyed while the vehicle is running only in the positive-torque state, but not in the engine-brake state. However, this arrangement does not provide significant inconvenience, since the vehicle usually runs in the positive-torque state.

According to a further aspect of the invention, there is provided a continuously variable transmission of a belt-and-pulley type for an automotive vehicle, the transmission having a first and a second shaft, a first and a second variable-diameter pulley provided on the first and second shafts, respectively, a transmission belt connecting the first and second pulleys to transmit power from one of the pulleys to the other, and a first and a second hydraulic cylinder for changing effective diameters of the first and second pulleys, the hydraulic control system comprising a hydraulic pressure source for pressurizing a working fluid, (2) a shift-control valve disposed between the pressure source and the hydraulic cylinders, (3) a second pressure line connected to the shaft-control valve, (4) a pressure regulating valve connected to the second pressure line, and (5) at least one restricted by-pass line which connects the second pressure line to at least one of the first and second hydraulic cylinders, respectively. The shift-control valve is adapted to receive a first line pressure from the pressure source through a first pressure line, and applying the first line pressure to one of the first and second hydraulic cylinders, while simultaneously permitting a flow of the fluid from the other hydraulic cylinder, thereby changing the effective diameters of the first and second pulleys to control a speed ratio of the transmission. The second pressure line receives from the shift-control valve a pressure of the fluid flowing from the other hydraulic cylinder. The pressure regulating valve regulates the pressure in the second pressure line, as a second line pressure lower than the first line pressure. The at least one restricted by-pass line permits a restricted flow between the second pressure line and the at least one hydraulic cylinder.

The hydraulic control system according to the above aspect of the invention provides the same advantage as the system described above, since the second line pressure established by the pressure regulating valve is applied to the low-pressure cylinder through the appropriate restricted by-pass line, if the amount of the leak flow of the fluid from the low-pressure cylinder exceeds the nominal value.

Further, the restricted by-pass line or lines assure that the pressure or pressures in the cylinder or cylinders, established by the shift-control valve, are maintained at a level near the second line pressure established by the pressure regulating valve, while the shift-control valve is placed in its neutral position. Consequently, there arises substantially no difference (ΔP2 indicated in FIG. 4) between the pressure in the low-pressure cylinder, and the second line pressure, even while the shift-control valve is placed near the neutral position. Hence, the present hydraulic control system also eliminates an equation for calculating the pressure difference, and therefore simplifies the control formulas for controlling the pressure regulating valve, eliminating an error due to inaccurate calculation of the pressure difference, and therefore resulting in improved accuracy of control of the second line pressure.

According to one feature of the above aspect of the invention, the shift-control valve comprises a valve body having a bore, and a valve spool slidably received within the bore. In this case, the restricted by-pass line or lines may be formed in the valve body, or in the valve spool. Alternatively, the by-pass line or lines may be a restrictor provided in the form of a radial clearance between the valve spool and a surface of the valve body defining the bore.

According to another feature of the same aspect of the invention, the at least one restricted by-pass line consists of a first and a second restricted by-pass line which are connected between the second pressure line, and corresponding conduits connecting the first and second hydraulic cylinders to the shift-control valve. In this case, the advantages mentioned above may be enjoyed, in both the positive-torque state and the engine-brake state of the vehicle.

According to a further feature of the same aspect of the invention, the input shaft is connected to the vehicle engine. The at least one restricted by-pass line consists of a single restricted by-pass line which is connected between the second pressure line, and a conduit connecting the other hydraulic cylinder to the shift-control valve. In this case, the advantages of the invention can be enjoyed while the vehicle is running only in the positive-torque state, and not in the engine-brake state. However, this arrangement does not provide significant inconvenience, since the vehicle usually runs in the positive-torque state.

BRIEF DESCRIPTION OF THE DRAWINGS

The above and optional objects, features and advantages of the present invention will become more apparent by reading the following detailed description of preferred embodiments of the invention, when considered in connection with the accompanying drawings, in which.

DETAILED DESCRIPTION OF THE PREFERRED EMBODIMENTS

The preferred embodiments of the present invention will be described in detail.

Figure 1:
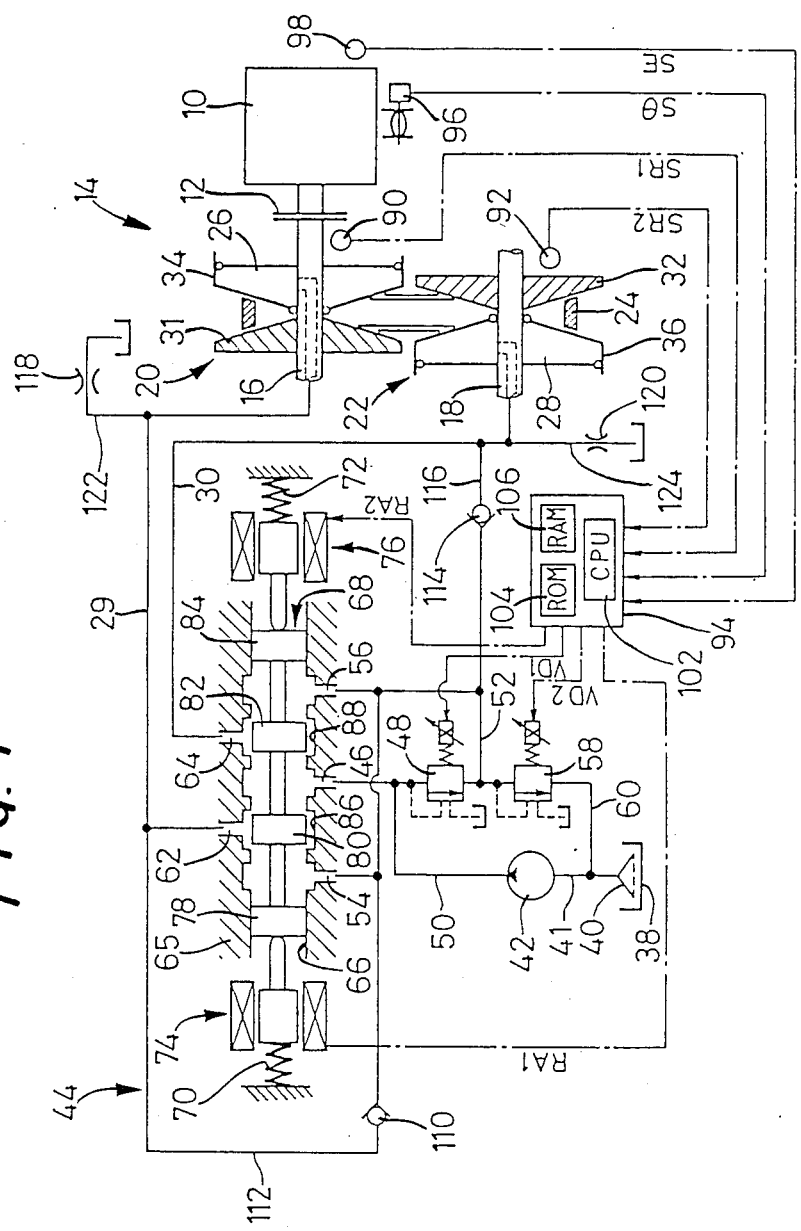
FIG. 1 is a schematic view showing an arrangement of one embodiment of a hydraulic control system of the present invention for controlling a continuously variable transmission.

Referring first to FIG. 1, there is shown a hydraulic control system for a continuously variable transmission 14 of a belt-and-pulley type for an automotive vehicle. The transmission 14 includes a first shaft 16 to which an output of an engine 10 of the vehicle is transmitted via a clutch 12.

The continuously variable transmission 14 including the first shaft 16 further includes a second shaft 18, a first variable-diameter pulley 20 provided on the first shaft 16, a second variable-diameter pulley 22 provided on the second shaft 18, a belt 24 connecting the first and second pulleys 20, 22 to transmit power between the first and second shafts 16, 18, a first hydraulic cylinder 26 for changing an effective diameter of the first pulley 20, and a second hydraulic cylinder 28 for changing an effective diameter of the second pulley 22. These first and second hydraulic cylinders 26 and 28 have the same pressure-receiving areas, and the first and second pulleys 20 and 22 have the same size, so that the continuously variable transmission 14 as a whole is relatively small-sized. The first pulley 20 has an axially stationary rotor 31 fixed to the first shaft 16, and an axially movable rotor 34 which is axially movable on the first shaft 16, cooperating with the stationary rotor 31 to form therebetween a V-groove having a variable width. Similarly, the second pulley 22 has an axially stationary rotor 32 and an axially movable rotor 36, which are provided on the second shaft 18 so as to form therebetween a variable-width V-groove.

An output of the second shaft 18 of the continuously variable transmission 14 is transmitted to drive wheels of the vehicle, via an auxiliary transmission, a differential gear, and other units, all of which are not shown.

The thus constructed power transmission system of the vehicle is operated by a hydraulic control system, which is arranged as described below. The power transmission system uses an oil reservoir 38 which is open to the atmosphere, and to which a working fluid is returned. The fluid in the reservoir 38 is pumped up by an oil pump 42 via a strainer 40 and a suction line 41. The thus pressurized fluid is fed to a first pressure line 50, which is connected to an input port 46 of a shift-control valve 44, and to a first pressure regulating valve 48. In the present embodiment of the hydraulic control system, the oil pump 42 constitutes a hydraulic power source, and is driven by the engine 10 via a drive shaft now shown. The first pressure regulating valve 48 is operated in response to a first VALVE DRIVE signal VD1 (which will be described), to release a portion of the fluid in the first pressure line, into a second pressure line 52, and thereby regulate a first line pressure Pl1 in the first pressure line 50. The second pressure line 52 is connected to a first and a second drain port 54, 56 of the shift-control valve 44, and to a second pressure regulating valve 58. This second pressure regulating valve 58 is operated in response to a second VALVE DRIVE signal VD2 (which will be described), to release a portion of the fluid in the second pressure line 52, into a drain line 60, and thereby regulate a second line pressure Pl2 in the second pressure line 52, so that the second line pressure Pl2 is lower than the first line pressure Pl1. The first and second pressure regulating valves 48, 58 are each constituted by a so-called solenoid-operated proportional relief valve.

The shift-control valve 44 is a so-called solenoid-operated proportional control valve, which includes a valve body 65 having: the input port 46; the first and second drain ports 54, 56; a first output port 62 connected to the first cylinder 26 via a conduit 29; a second output port 64 connected to the second cylinder 28 via a conduit 30; and a cylinder bore 66 which communicates with all of these ports 46, 54, 56, 62 and 64. The shift-control valve 44 further includes: a valve spool 68 slidably received in the cylinder bore 66; a first spring 70 and a second spring 72 which are disposed at opposite ends of the valve spool 68, to bias the spool 68 in opposite directions toward a neutral position of the spool 68, thus holding the spool 68 in its neutral position; and a first and a second solenoid 74, 76 which are disposed at the opposite ends of the valve spool 68, to move the spool 68 against the biasing action of the second or first spring 72, 70. The valve spool 68 has formed thereon four lands 78, 80, 82 and 84, which are disposed in the order of description from the end of the spool on the side of the first spring 70. The two intermediate lands 80, 82 are formed such that the lands 80, 82 are aligned with the first and second output ports 62, 64, respectively, in the longitudinal direction of the spool 68, when the spool 68 is placed in its neutral position. The inner surface of the cylinder bore 66 is formed with a first and a second annular groove 86, 88 which are opposite to the intermediate lands 80, 82, respectively, when the spool 68 is placed in its neutral position. In other words, the first and second annular grooves 86, 88 are formed in the spaced-apart portions of the inner surface of the cylinder bore 66, in which the first and second output ports 62, 64 are open. The first and second annular grooves 86, 88 have a width larger than that of the first and second output ports 62, 64, and cooperate with the intermediate lands 80, 82 to form variable flow restrictors which have a continuously variable area of flow of the fluid therethrough.

While the valve spool 68 is placed in the neutral position, the first and second output ports 62, 64 are held in communication with the input port 46, and with the first and second drain ports 54, 56, with a relatively small equal area of communication. Namely, the first and second hydraulic cylinders 26, 28 are supplied with small flows of the fluid from the first and second output ports 62, 64, in order to compensate for leakage flows of the fluid from the cylinders 26, 28. At the same time, small flows of the fluid are discharged from the first and second drain ports 54, 56.

As the valve spool 68 is moved from its neutral position in one of the longitudinal directions, for example, toward the second solenoid 76 (in the right direction as viewed in FIG. 1), the area of communication between the first output port 62 and the first drain port 54 continuously increases, while the area of communication between the second output port 64 and the input port 46 continuously increases. Consequently, the pressure of the fluid to be applied from the first output port 62 to the first cylinder 26 is made lower than that of the fluid to be applied from the second output port 64 to the second cylinder 28. As a result, the equilibrium in the thrust between the first and second cylinders 26, 28 of the transmission 14 is gradually lost, whereby the fluid from the second output port 64 flows into the second cylinder 28, whereas the fluid in the first cylinder 26 is discharged. Thus, the speed ratio e of the transmission 14 (e=Nout/Nin, where Nout: speed of the second shaft 18, Nin: speed of the first shaft 16) is decreased.

Conversely, as the valve spool 68 is moved from the neutral position toward the first solenoid 74 (in the left direction in FIG. 1), the area of communication between the first output port 62 and the input port 46 increases, while the area of communication between the second output port 64 and the second drain port 56 increases. Consequently, the pressure of the fluid to be applied from the first output port 62 to the first cylinder 26 is made higher than that of the fluid to be applied from the second output port 64 to the second cylinder 28. Coonsequently, the equilibrium in the thrust between the two cylinders 26, 28 is gradually lost, and the fluid is discharged from the second cylinder 28, whereas the fluid flows into the first cylinder 26. As a result, the speed ratio e of the transmission 14 is increased. As described above, the shift-control valve 44 has not only a function of a directional control valve capable of applying a relatively high fluid pressure to one of the cylinders 26, 28 and a relatively low fluid pressure to the other cylinder (i.e., for changing the directions of flow of the fluid to and from the cylinders), but also a function of a flow control valve capable of continuously adjusting rates of flow of the fluid to and from the cylinders 26, 28.

Figure 3:
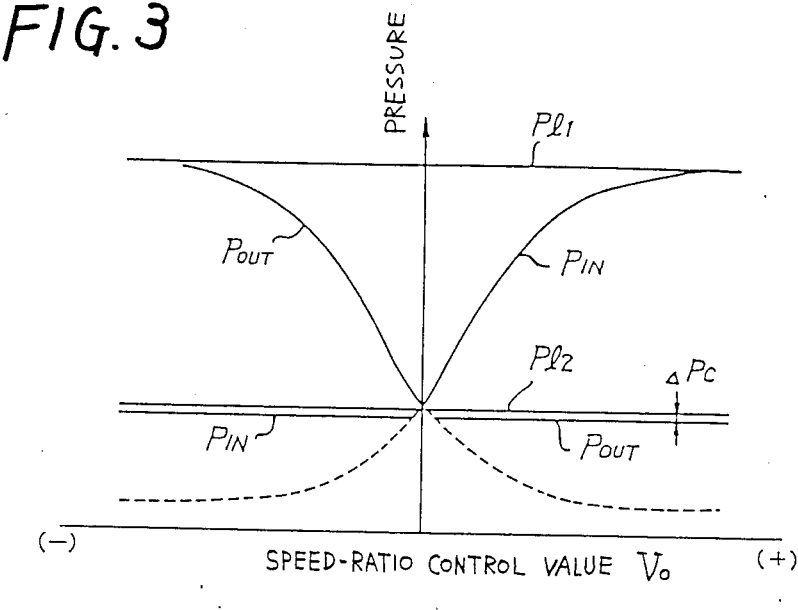
FIG. 3 is a view showing output characteristics of a shift-control valve used in the hydraulic control system of FIG. 1.
Figure 4:
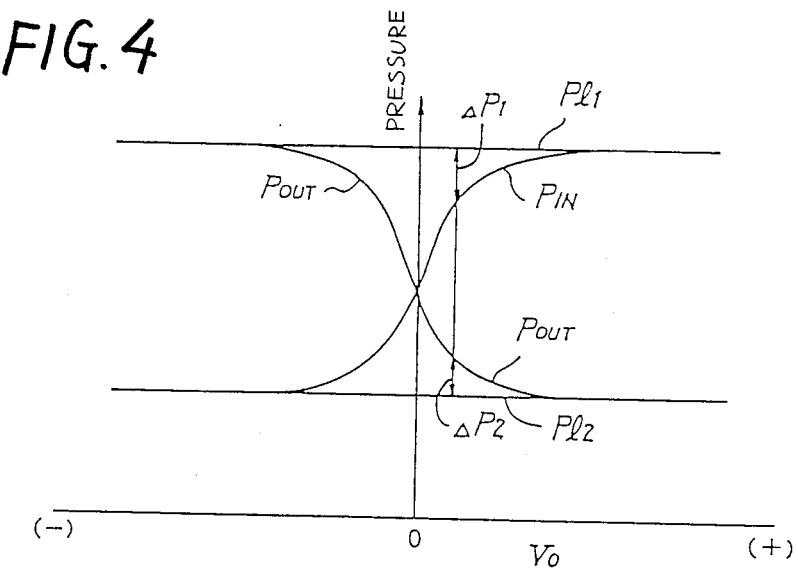
FIG. 4 is a view showing output characteristics of a shift-control valve used in a conventional hydraulic control system wherein no one-way by-pass lines are provided.

In the present embodiment, the second pressure line 52 is connected to the first hydraulic cylinder 26 (conduit 29) by a one-way by-pass line 112. This by-pass line 112 has a check valve 110 which permits a flow of the fluid only in a direction toward the first hydraulic cylinder 26. The second pressure line 52 is also connected to the second hydraulic cylinder 28 (conduit 30) by another one-way by-pass line 116, which has a check valve 114 permitting a flow of the fluid only in a direction toward the second hydraulic cylinder 28. The first and second cylinders 26, 28 are connected to restricted leak lines 122, 124, respectively. These leak lines 122, 124 have respective flow restrictors 118, 120, so that the fluids in the first and second cylinders 26, 28 may leak into a drain through the flow restrictors 118, 120. The rates of leak flows of the fluids from the first and second cylinders 26, 28 are determined so that the output pressures of the shift-control valve 44 (pressure Pin in the first cylinder 26 and pressure Pout in the second cylinder 28) are substantially equal to the second line pressure Pl2, as indicated in FIG. 3, while the valve spool 68 is placed in its neutral position. FIG. 4 shows the output characteristics of a shift-control valve of a hydraulic control system wherein no such leak lines are provided for restricted leak flows of the fluid form the cylinders. As seen from these figures, the output pressure levels Pin and Pout are generally lowered in the instant arrangement of FIG. 3 due to the leak flows through the leak lines 122, 124, as compared with those in the arrangement of FIG. 4.

Although the leak flows through restricted leak lines 122, 124 simply lower the pressures Pin and Pout generally, the by-pass lines 112, 116 serve to maintain the pressures Pin and Pout at the second line pressure Pl2 as indicated in solid lines in FIG. 3, when the valve spool 68 is moved past the neutral position (Vo position). Namely, if the by-pass lines 112, 116 were not provided, the pressures Pin and Pout would be lower than the second line pressure as indicated in dashed lines in FIG. 3. Described more specifically, the second line pressure Pl2 in the second pressure line 52 is applied through the one-way by-pass line 112 or 116 to one of the first and second cylinders 26, 28 provide on a driven shaft (output shaft 18 when the engine 10 is operating in a positive torque state, i.e., providing a positive torque to the drive wheels of the vehicle), when the pressure Pin or Pout in the cylinder 26, 28 on the driven shaft (for example, Pout) falls below the second line pressure Pl2 after the valve spool 68 is moved past the neutral position. Consequently, the pressure in the cylinder 26, 28 on the driven shaft is maintained substantially at the second line pressure Pl2. This arrangement eliminates a difference ($\Delta P2$ as indicated in FIG. 4) between the second line pressure Pl2 and the pressure in the cylinder on the driven shaft, even if the valve spool 68 is more or less offset from its neutral position while the thrust forces of the first and second cylinders 26, 28 of the transmission 14 are in equilibrium. When the pressure Pin in the first cylinder 26 or the pressure Pout in the second cylinder 28 exceeds the second line pressure Pl2, the check valve 110 or 114 functions to prevent the fluid flows from the cylinder 26, 28 to the second pressurel line 52.

The continuously variable transmission 14 has a first speed sensor 90 for detecting the rotating speed Nin of the first shaft 16, and a second speed sensor 92 for detecting the rotating speed Nout of the second shaft 18. The first and second speed sensors 90, 92 produce first and second ROTATION signals SR1 and SR2 indicative of the rotating speeds Nin and Nout, respectively, which signals SR1 and SR2 are applied to a controller 94. Further, the engine 10 is provided with a throttle sensor 96 for sensing a current throttle position $\theta$th of a throttle valve disposed in an intake manifold, and also with an engine-speed sensor 98 for sensing a current speed Ne of the engine 10. The throttle sensor 96 produces a THROTTLE signal $S\theta$ indicative of the current throttle position $\theta$th, and the engine-speed sensor 98 produces an ENGINE SPEED signal SE indicative of the current engine speed Ne. These signals are also applied to the controller 94.

The controller 94 indicated above, which serves as control means for the hydraulic control system for the transmission 14, is constituted by a so-called microcomputer which includes a CPU 102 (central processing unit), a ROM 104 (read-only memory), a RAM 106 (random-access memory). The CPU 102 is adapted to process various input signals according to control programs stored in the ROM 104, while utilizing a temporary data storage function of the RAM 106. According to the processed input signals, the CPU 102 applies to the first and second pressure regulating valves 48, 58 the first and second VALVE DRIVE signals VD1 and VD2, for regulating the pressures in the first and second pressure lines 50, 52. Further, the CPU 102 feeds to the first and second solenoids 74, 76 first and second SPEED RATIO signals RA1 and RA2 for controlling the speed ratio e of the transmisstion 14.

Referring next to the flow chart of FIG. 2, the operation of the present hydraulic control system for the transmission 14 will be described.

Initially, the CPU 102 executes step S1, wherein the rotating speed Nin of the first shaft 16, the rotating speed Nout of the second shaft 18, the throttle position $\theta$th, and the engine speed Ne are read and stored into the RAM 106, according to the first and second ROTATION signals SR1, SR2, the THROTTLE SIGNAL S$\theta$, and the ENGINE SPEED signal SE. Then, the CPU 102 goes to step S2 in which the speed ratio e is calculated based on the stored speeds Nin and Nout, according to the following equation (1) stored in the ROM 104:

$$e = Nout/Nin \quad (1)$$

Figure 5:
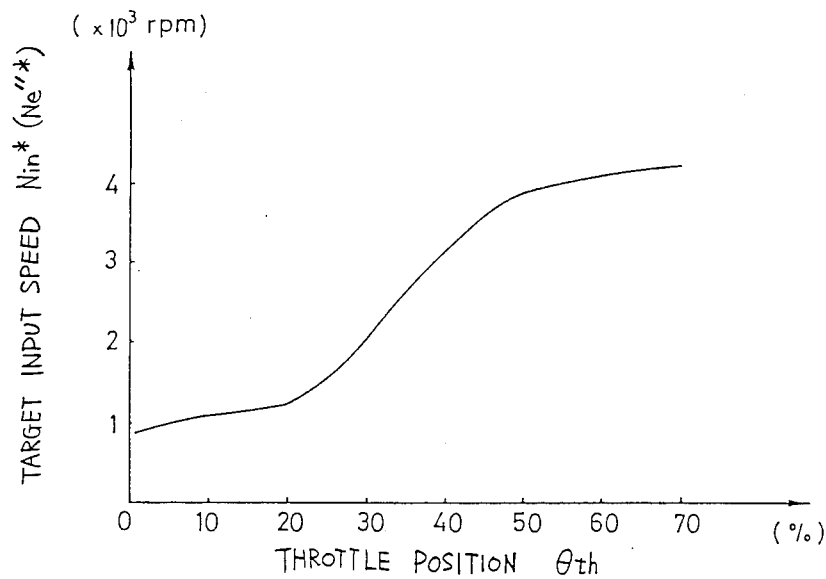
FIG. 5 is a view showing a relationship used in the operation illustrated in FIG. 2.
Figure 6:
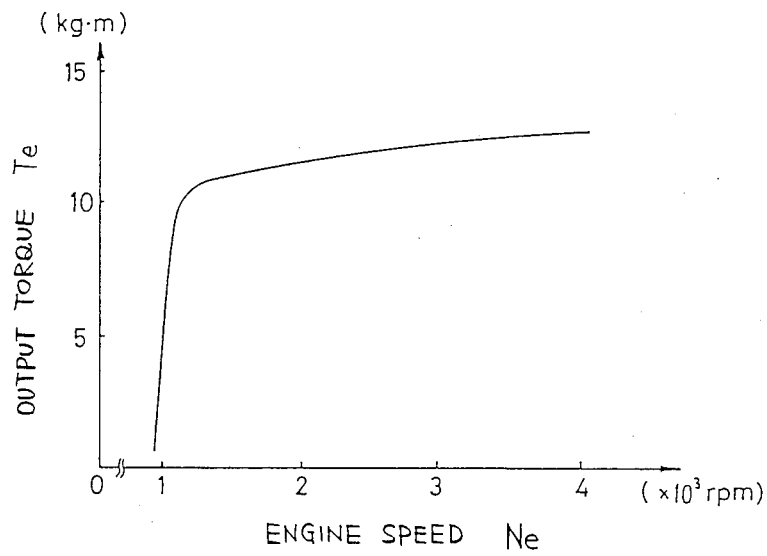
FIG. 6 is a view showing a speed-output torque curve for minimum fuel consumption by an engine.

Step S2 is followed by step S3 wherein a desired or target input speed Nin* of the first shaft 16 is determined based on the stored throttle position $\theta$th and other variables, according to a predetermined relation stored in the ROM 104. Based on the determined target input speed Nin* and the stored speed Nout, a target speed ratio e* is determined according to the above equation (1). The relation for determining the target input speed Nin* is shown in FIG. 5, by way of example only. This relation is predetermined so as to operate the engine 10 with a minimum fuel consumption, according to the torque-speed curve indicated in FIG. 6. In the following step S4, a speed-ratio control value Vo is determined according to the following equation (2) stored in the ROM 104:

$$Vo = k(e^* - e)/e \quad (2)$$

where, k: control constant

In step S14 which will be described, if the determined speed-ratio control value Vo is positive, the CPU 102 produces the second SPEED-RATIO signal RA2 so that the valve spool 68 is moved in the left direction, to increase the rotating speed Nout of the second shaft 18. If the determined value Vo is negative, the CPU 102 produces in step S14 the first SPEED-RATIO signal RA1 so that the valve spool 68 is moved in the right direction, to increase the rotating speed Nin of the first shaft 16. The speed-ratio control value Vo is proportional to the magnitude of the SPEED-RATIO signal RA1 or RA2, and therefore to the amount of movement of the valve spool 68. As is apparent from the equation (2), therefore, the speed-ratio control value Vo is determined so that the actual speed ratio e coincides with the determined target speed ratio e*.

Figure 7:
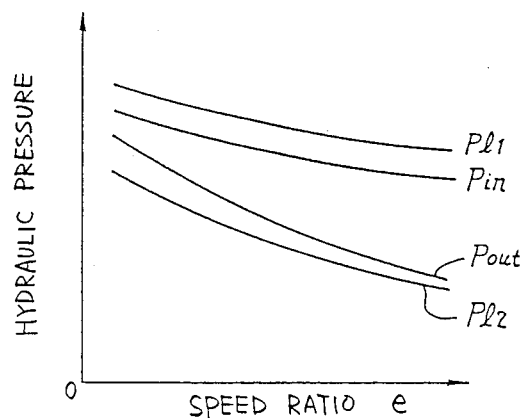
FIGS. 7 and 8 are views representing changes in hydraulic pressures in the hydraulic control system, in relation to the speed ratio of the continuously variable transmission, FIG. 7 showing the changes while the engine is producing a positive torque, and FIG. 8 showing the changes while the engine is providing a braking effect.
Figure 8:
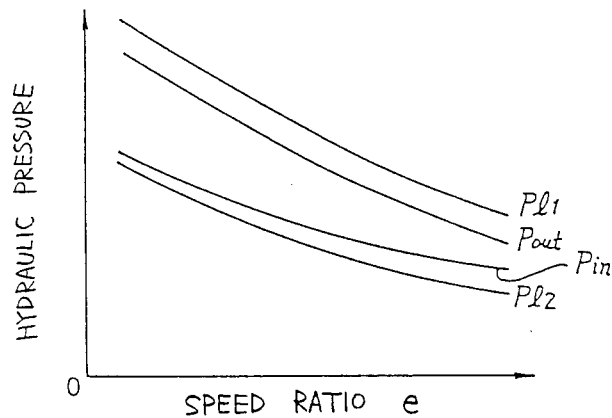

In step S5, an actual output torque Te of the engine 10 is determined based on the throttle position $\theta$th and the engine speed Ne, according to a well known relationship stored in the ROM 104. In the next step S6, the CPU 102 checks to see if the output torque Te of the engine 10 is positive or not, namely, to see if the engine 10 is placed in a positive-torque condition providing a positive torque, or in an engine-brake condition providing a braking effect to the vehicle. This judgment is necessary because the pressure changing characteristics of the hydraulic cylinders 26, 28 in relation to the speed ratio e differ depending upon the direction of power transmission, that is, depending upon whether the engine 10 is in the positive-torque condition or the engine-brake condition. Described more specifically, FIGS. 7 and 8 show changes in pressures Pin and Pout in the first and second cylinders 26, 28, in relation to the speed ratio e of the transmission 14, when the engine 10 is placed in the positive-torque and engine-brake conditions, respectively. As indicated in these figures, the magnitudes of the pressures Pin and Pout are reversed when the engine 10 is switched from the positive-torque condition to the engine-brake condition, or vice versa. Namely, the pressure in one of the cylinders 26, 28 which is provided on the drive shaft (16 in the positive-torque condition, or 18 in the engine-brake condition), is higher than the pressure in the other cylinder provided on the driven shaft. Although this phenomenon should be discussed in terms of the magnitudes of the thrust forces produced by the first and second cylinders 26, 28, the phenomenon has been discussed in terms of the pressures of the fluid in the two cylinders 26, 28, since the two cylinders have the same pressure-receiving areas.

If the checking in step S6 reveals that the output torque Te is positive, step S6 is followed by step S7 in which a second line-pressure control value V2 is determined so as to obtain a pressure (target pressure) Pout' of the second cylinder 28 necessary to establish a required minimum tension of the transmission belt 24. More specifically, an optimum thrust Wout' (calculated value) of the second cylinder 28 is first obtained based on the actual output torque Te of the engine 10 and the actual speed ratio e of the transmission 14, according to the following equation (3) stored in the ROM 104. Further, the pressure Pout' (equal to the second line pressure Pl2, because of the one-way by-pass lines 112, 116) is obtained based on the determined thrust Wout' and pressure-receiving area Aout of the second cylinder 28, and on the rotating speed Nout of the second shaft 28, according to the following equation (4) stored in the ROM 104. Then, the second line-pressure control value V2 is determined so as to obtain the calculated second line pressure Pl2 (Pout'), according to the following equation (5) also stored in the ROM 104.

$$Wout' = f(Te, e) \quad (3)$$

$$Pout' = \frac{Wout'}{Aout} - C2 \, Nout^2 \quad (4)$$

$$V2 = f(Pout') \quad (5)$$

The equation (3) is predetermined so as to establish the required minimum tension of the transmission belt 24, i.e., a required minimum force acting on the belt 24. The thrust Wout' is increased in proportion to a quotient of the output torque Te divided by the speed ratio e, i.e., Te/e. The second term of the equation (4) is a centrifugal pressure which increases with the speed Nout, and which is subtracted from the first term of the equation to correct the pressure Pout'. A value C2 in the second term is a centrigual-force compensating constant which is predetermined by the specifications of the second cylinder 28, and the specific gravity of the working fluid used. The equation (5) is provided in the form of a stored data map predetermined so as to determine the second line-pressure control value V2 for obtaining the calculated second line pressure Pl2, taking the operating characteristics of the second pressure regulating valve 58 into consideration.

If the one-way by-pass lines 112, 116 were not provided, the following equations (6), (7) and (8) must be used in addition to the above equation (4): equation (6) for calculating the previously indicated error $\Delta$P2; equation (7) for calculating the optimum second line pressure Pl2 by subtracting the error $\Delta$P2 from the pressure Pout'; and equation (8) for determining the second line-pressure control value V2. In other words, the present embodiment significantly simplifies the arithmetic operations for obtaining the control value V2.

$$\Delta P2 = f(e, e^*, Te) \quad (6)$$

$$Pl2 = Pout' - \Delta P2 \quad (7)$$

$$V2 = f(Pl2) \quad (8)$$

In the next step S8, the first line-pressure control value V1 is determined so as to obtain the pressure Pin' (target pressure) of the first cylinder 26 necessary to provide a required minimum thrust for establishing the target speed ratio e*. Described more specifically, a thrust ratio $\gamma+$ of the two cylinders 26, 28 (Wout of the cylinder 28/Win of the cylinder 26) in the positive-torque condition of the engine 10 is first calculated based on the target speed ratio e* and the actual output torque Te of the engine 10, according to the following equation (9). Then, a thrust Win' of the first cylinder 26 is obtained based on the calculated thrust ratio $\gamma+$ and the calculated thrust Wout' of the second cylinder 28, according to the following equation (10). Further, a pressure Pin' (calculated value) is obtained based on the calculated thrust Win' and the pressure-receiving area Ain of the first cylinder 26, and the rotating speed Nin of the first shaft 16, according to the following equation (11). Then, the first line pressure Pl1 is calculated based on the calculated pressure Pin' and pressure compensation value $\Delta P1$, according to the following equation (12), and the first line-pressure control value V1 is determined based on the calculated first line pressure Pl1, according to the following equation (13).

$$\gamma+ = f(e^*, Te) \quad (9)$$

$$Win' = \frac{Wout'}{\gamma+} \quad (10)$$

$$Pin' = \frac{Win'}{Ain} - C1\,Nin^2 \quad (11)$$

$$Pl1 = Pin' + \Delta P1 \quad (12)$$

$$V1 = f(Pl1) \quad (13)$$

The equation (9) is a relationship predetermined so as to obtain the required thrust ratio $\gamma+$ of the two cylinders 26, 28 in relation to the target speed ratio e* and actual output torque Te, in order to control the first line pressure for providing an optimum shifting response of the transmission 14 over the entire range of operation. The second term of the equation (11) is a centrifugal pressure which increases with the speed Nin, which is subtracted from the first term of the equation. A value C1 is a constant determined by the specifications of the first cylinder 26 and the specific gravity of the working fluid. The equation (12) is provided to determine the first line pressure Pl1 by adding the pressure compensation value $\Delta P1$ to the pressure Pin' calculated from the equation (11). This compensation value $\Delta P1$ is determined so as to provide an optimum compromise between a power loss of the hydraulic system and a control error $\Delta e$ (corresponding to $\Delta Vo$) of the speed ratio e, which power loss and the error are incompatible with each other.

The equation (13) is provided in the form of a stored data map predetermined to determine the first line-pressure control value V1, for obtaining the calculated first line pressure Pl1, taking the operating characteristics of the first pressure regulating valve 48 into consideration.

If the checking in step S6 reveals that the determined output torque Te of the engine 10 is equal to zero or negative, that is, the engine 10 is in the engine-brake condition, with power being transmitted from the vehicle wheels to the engine, step S6 is followed by steps S9 and S10 similar to steps S7 and S8. In these steps S9 and S10, the second and first line-pressure control values V2 and V1 are determined based on the pressures Pin' and Pout' required for the second and first cylinders 28, 26, respectively. More specifically, step S9 is executed to: determine the optimum thrust Win' of the first cylinder 26 based on the determined torque Te and speed ratio e, according to the following equation (14) stored in the ROM 104; calculate the pressure Pin' to be applied to the first cylinder 26, according to the following equation (15) also stored in the ROM 104; and determine the second line-pressure control value V2 based on the calculated pressure Pin', according to the following equation (16) also stored in the ROM 104. The next step S10 is executed to: calculate a thrust ratio $\gamma-$ of the two cylinders 26, 28 based on the target speed ratio e* and output torque Te, according to the following equation (17); obtain the thrust Wout' of the second cylinder 28 based on the calculated thrust ratio $\gamma-$ and thrust Win' of the first cylinder 26, according to the following equation (18); calculate the pressure Pout' in the second cylinder 28 according to the following equation (19); determine the first line pressure Pl1 based on the calculated pressure Pout' and compensation value $\Delta P1$, according to the following equation (20); and determine the first line-pressure control value V1 for obtaining the determined first line pressure Pl1, according to the previously indicated equation (13).

$$Win' = f(Te, e) \quad (14)$$

$$Pin' = \frac{Win'}{Ain} - C1\,Nin^2 \quad (15)$$

$$V2 = f(Pin') \quad (16)$$

$$\gamma- = f(e^*, Te) \quad (17)$$

$$Wout' = \gamma- \cdot Win' \quad (18)$$

$$Pout' = \frac{Wout'}{Aout} - C2\,Nout^2 \quad (19)$$

$$Pl1 = Pout' + \Delta P1 \quad (20)$$

After steps S7 and S8, or steps S9 and S10 have been executed as described above to determine the second and first line-pressure control values V2 and V1, the next step S11 is executed to check if an error $\Delta e$ of the actual speed ratio e with respect to the target speed ratio e* is positive or not. If the error $\Delta e$ is positive, step S11 is followed by step S12 wherein the first and second line-pressure control values V1 and V2 are corrected according to the following equations (21) and (22), respectively. If the error $\Delta e$ is equal to zero or negative, step S11 is followed by step S13 in which the first and second line-pressure control values V1 and V2 are corrected according to the following equations (23) and (24), respectively.

$$V1 = V1 + k1(e^* - E)/e \quad (21)$$

$$V2 = V2 - k2(e^* - e)/e \quad (22)$$

$$V1 = V1 + k3(e - e^*)/e \quad (23)$$

$$V2 = V2 - k4(e - e^*)/e \quad (24)$$

where, K1, K2, K3, K4: constants

As is apparent from the above equations, step S12 and S13 are executed to determine the control values V1 and V2 so that the rate of change in the speed ratio e of the transmission 14 is increased by increasing the difference between the first and second line pressuers Pl1 and Pl2, as the absolute value of the error Δe increases. In the postiive-torque condition, for example, the first line pressure Pl1 is higher by the compensation value ΔP1 than the pressure Pin in the first cylinder 26 (Pin in the cylinder 26 being higher than Pout in the cylinder 28, while the engine 10 is in the positive-torque condition). It is noted that the first line pressure cannot be rasied so high, from the standpoint of reducing the power loss of the hydraulic system, and therefore the speed ratio e cannot be changed at a sufficiently high rate. According to the present invention, however, the difference between the first and second line pressures Pl1 and Pl2 is increased with the absolute value of the error Δe. Namely, while the difference between the actual speed ratio e and the target speed ratio e* is relatively large, the difference between the first and second line pressures Pl1 and Pl2 is made relatively large, so that the actual speed ratio e can be changed at an accordingly high rate, i.e., the transmission 14 can be shifted with an improved response.

Figure 9:
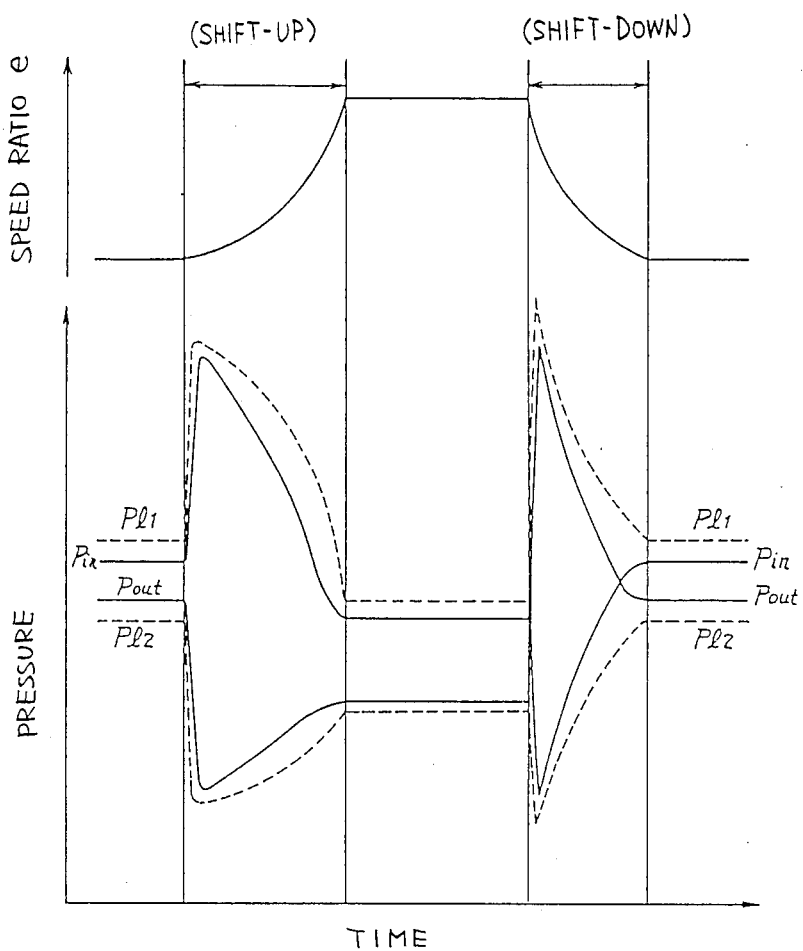
FIG. 9 is a view showing changes in hydraulic pressures in the system while the transmission is operated to increase and decrease its speed ratio.

The constants k1, k2, k3 and k4 used in the equations (21), (22), (23) and (24) affect the shifting response of the transmission 14. In this embodiment, k1 is smaller than k3, while k2 is smaller than k4, since a fast shiftdown and a slow shift-up of the transmission 14 generally gives the vehicle driver a better drive feel. FIG. 9 shows changes in the first and second line pressures Pl1, Pl2 and the pressures Pin and Pout in the first and second cylinders 26, 28, as the speed ratio is changed while the transmission 14 (engine 10) is operating in the positive-torque condition (with Pin higher than Pout). As is apparent from the figure, when the transmission 14 is shifted up (with an increasing speed ratio e) by a leftward movement (in FIG. 1) of the valve spool 68 of the shift-control valve 44, the pressure Pin in the first cylinder 26 is raised while at the same time the pressure Pout in the second cylinder 28 is lowered. On the other hand, when the transmission 14 is shifted down (with a decreasing speed ratio e), the pressure Pin in the first cylinder 26 is lowered while at the same time the pressure Pout in the second cylinder 28 is raised. Thus, there is developed a considerably large difference in the thrust force between the two cylinders 26, 28, necessary and sufficient to provide a fast response of the cylinders for relatively rapidly changing the speed ratio of the transmission 14.

In step S14, which is the last step of the series of steps of a control cycle, the signals RA1, RA2, VD1, VD2 are produced according to the speed-ratio control value Vo and the first and second line-pressure control values V1 and V2 which have been determined in the previous steps. As a result, the speed ratio e, and the first and second line pressures Pl1 and Pl2 are controlled, as indicated in FIGS. 7, 8 and 9.

In the illustrated hydraulic control system, the pressure Pin or Pout whichever is lower, that is, the pressure in the hydraulic cylinder 26 and 28 on the driven shaft will not fall below the second line pressure Pl2 used to maintain a suitable tension of the transmission belt 24, even if a leakage of the fluid from the hydraulic system increases to a considerable extent due to an abnormal rise of the temperature of the working fluid, deterioration of sealing members for the cylinders 26, 28, entry of foreign matters into the working fluid, or other reasons. Namely, the second line pressure Pl2 established by the second pressure regulating valve 58 is applied to the cylinders 26, 28 through the one-way by-pass lines 112, 116, even if the pressure in the cylinder 26, 28 on the driven shaft unexpectedly drops due to the leakage of the fluid. Thus, the by-pass lines 112, 16 is effective to preventing an abnormal decline of the tension of the transmission belt 24, and a consequent slip of the belt on the pulleys 20, 22, which lead to shortening the life expectancy of the transmission 14.

Further, the restricted leak lines 122, 124 permit suitably adjusted leak flows of the fluid from the first and second cylinders 26, 28, which result in lowering the output pressures of the shift-control valve 44 over its entire operating range, that is, lowering the pressures Pin and Pout as shown in FIG. 3. In addition, the one-way by-pass lines 112, 116 maintain the pressure Pin or Pout in the cylinder 26 or 28 on the driven shaft, at the second line pressure Pl2 adjusted by the second pressure regulating valve 58, as discussed above. Hence, there is eliminated a difference between the output pressure of the shift-control valve 44 applied to the low-pressure cylinder on the driven shaft, and the second line pressure Pl2 established by the second pressure regulating valve 58. Thus, the present hydraulic control system permits simplication of the control for determining the control values for the second pressure regulating valve 58 to exactly regulate the pressure Pin or Pout in the low-pressure cylinder (provided on the driven shaft 16 or 18). More specifically, if and when there exists an appreciable difference ΔP2 between the second line pressure Pl2 and pressure Pin or Pout in the low-pressure cylinder as indicated in FIG. 4, the difference is calculated according to the previously indicated equation (6), based on the actual speed ratio e, target speed ratio e* and output torque Te, so that the control value for the second line pressure is compensated for the calculated difference or error. However, it is difficult to formulate an equation for accurate calculation of the difference. Usually, therefore, a suitable average value is set for the difference, or the difference is obtained by approximation. Further, the specific characteristics of the second pressure regulating valve 58 must be taken into consideration when the difference is calculated. For these reasons, it is inevitable that the value ΔP2 used to calculate the second line-pressure control value V2 is more or less inaccurate. This is contrary to the instant arrangement, which does not suffer from such a pressure difference P2, and therefore permits precise control of the second pressure regulating valve 58. Obviously, the instant arrangement does not require a data map or equation for calculating the difference ΔP2, nor a calculation for compensating the second line pressure Pl2 for the calculated difference.

Other embodiments of the present invention will be described. The same reference numerals as used in the preceding embodiment will be used in these other embodiments to identify the functionally corresponding elements, and no redundant description of these elements will be provided.

Figure 10:
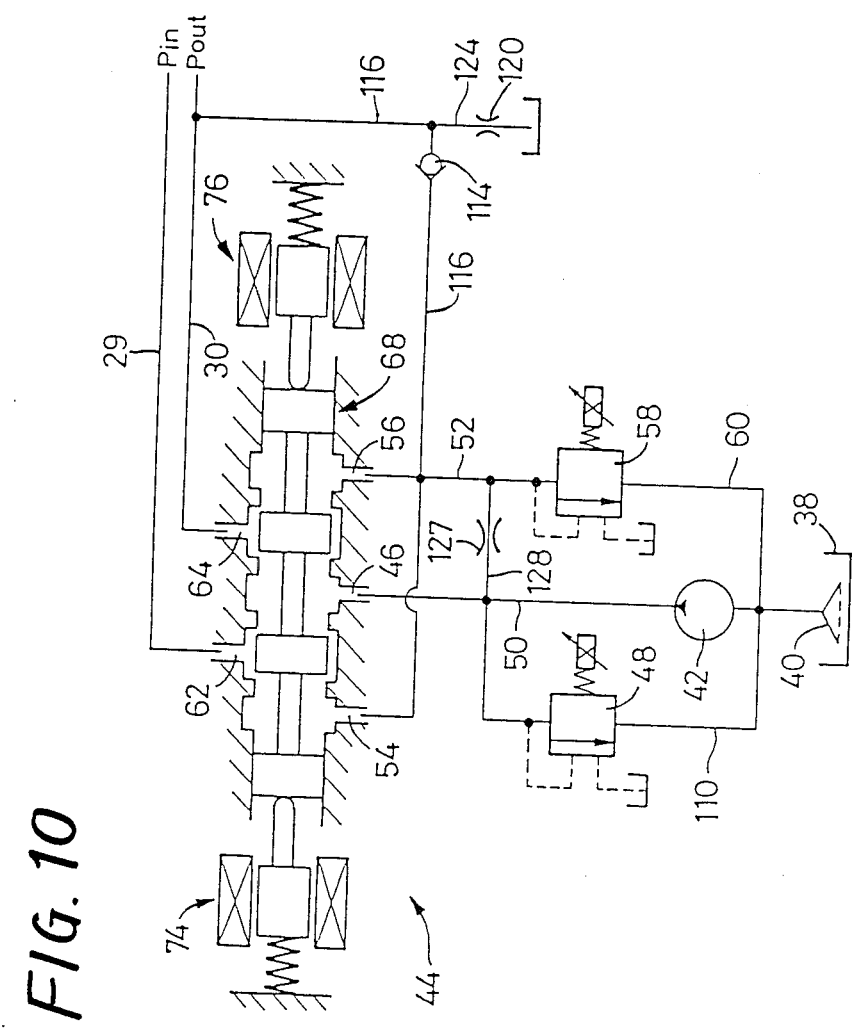
FIG. 10 is a fragmentary schematic view of another embodiment of the invention.

There is shown in FIG. 10 a hydraulic control system for the belt-and-pulley type continuously variable transmission 14, wherein the first and second pressure regulating valves 48, 58 are disposed at different positions in the hydraulic circuit, than those used in the preceding embodiment. Described in more detail, the first pressure regulating valve 48 is disposed so that the fluid in the first pressure line 50 may be released through the valve 48 directly to the suction side of the oil pump 42 through a drain line 126. The fluid delivered from the oil pump 42 through the first pressure line 50 is also fed to the second pressure line 52 through a line 128 in which a flow restrictor 127 is provided. This line 128 provides a flow of the fluid necessary to enable the second regulating valve 58 to function for controlling the second line pressure Pl2, and to assure a difference between the first and second line pressures Pl1 and Pl2. In other words, the second pressure regulating vale 58 operates to regulate the pressure of the fluid supplied through the line 128, and the pressure of the fluid discharged through the second drain port 56 of the shift-control valve 44. In the present embodiment, only the one-way by-pass line 116 equipped with the check valve 114 is provided, connecting the second pressure line 52 and the conduit 30. The by-pass line 116 is connected to the leak line 124 to allow a restricted leak flow of the fluid from the second cylinder 28.

Figure 11:
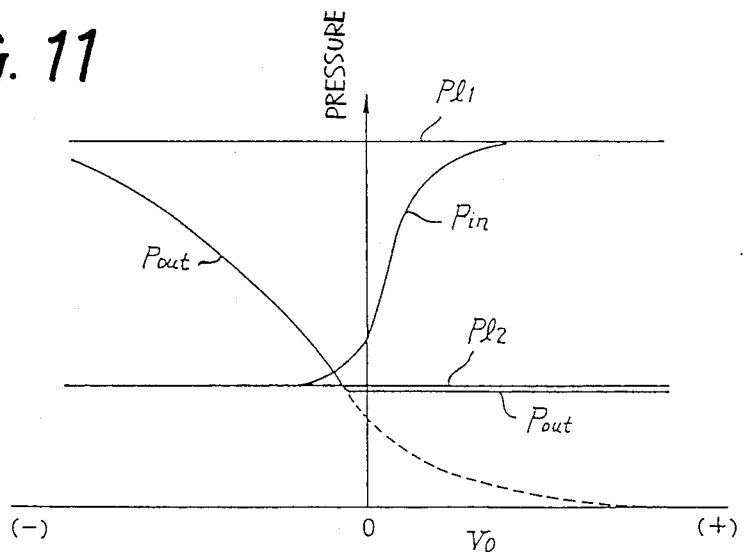
FIG. 11 is a view showing output characteristics of a shift-control valve used in the embodiment of FIG. 10.

In the present modified embodiment, the shift-control valve 44 has the output characteristics as shown in FIG. 11, wherein the pressure Pout in the second cylinder 28 is generally made lower (pressure curve Pout has a comparatively small gradient), and the lower limit of the pressure Pout is maintained at the level of the second line pressure Pl2. On the other hand, the pressure Pin in the first cylinder 26 which is not connected to a restricted leakage line is controlled in the conventional manner. According to this arrangement, the control error in relation to the pressure difference $\Delta P2$ is relatively large in the negative range of the control value Vo, but the value $\Delta Vo$ is held extremely small in the positive range of the control value Vo, as in the preceding embodiment. In the positive range of the control value Vo, that is, while the vehicle is running in the positive-torque state (with a torque transmitted from the engine 10 to the drive wheels), the pressure Pout in the second cylinder 28 on the output or driven shaft 18 is maintained substantially at the second line pressure Pl2. Thus, the control error $\Delta Vo$ can be minimized in the positive-torque state of the vehicle. In this connection, it is noted that the engine-braking state of the vehicle does not require the speed ratio control of the transmission as accurate as required in the positive-torque state. In this sense, the present modified embodiment is also practically effective.

Figure 12:
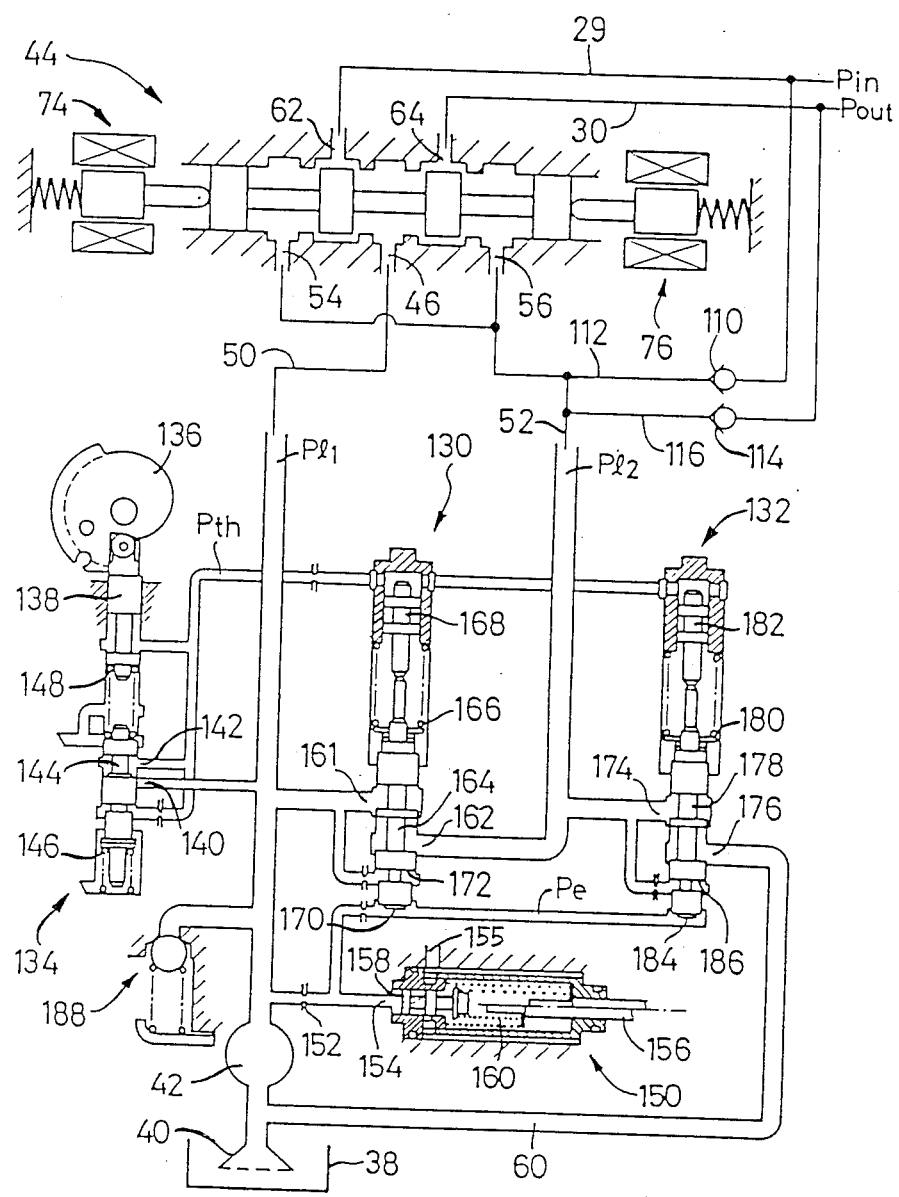
FIG. 12 is a schematic view of a further embodiment of the invention.

Referring next to FIG. 12, there is shown another modified hydraulic control system wherein hydraulically controlled first and second pressure regulating valves 130, 132 are used, in place of the pressure regulating valves 48, 58 which are solenoid-operated proportional relief valves.

Described in greater detail, the hydraulic control system includes a throttle-position sensing valve 134 for sensing the operating position of a throttle valve (not shown). This sensing valve 134 includes: a plunger 138 axially moved by a cam 136 which rotates with the throttle valve; a valve spool 144 operable to connect or disconnect an input port 140 and an output port 142; a spring 146 for biasing the spool 144 in a direction to disconnect the input and output ports 140, 142; and a spring 148 disposed between the plunger 138 and the spool 144, for biasing the spool 144 in a direction to effect communication between the input and output ports 140, 142. The biasing force of the spring 148 is varied with the throttle position of the throttle valve. In operation, the valve spool 144 is moved to a position at which the biasing force of the spring 148 in the direction to open the valve is equal to a sum of the biasing force of the spring 146 in the direction to close the valve, and a thrust force produced by a feedback pressure (Pth), which acts to close the valve. The throttle-position sensing valve 134 having the thus operated spool 144 produces from the output port 142 a throttle pressure Pth which increases with the throttle valve opening. The throttle pressure Pth is applied to the first and second pressure regulating valves 130, 132.

The hydraulic control system further includes a speed-ratio sensing valve 150 which includes: a port 154 connected to the first pressure line 50 through a flow restrictor 152; a rod 156 which is axially moved in sliding contact with the movable rotor 34 or 36 of the transmission 14; a valve spool 158 which is axially movable to change the area of communication between the port 154 and a drain port 155; a spring 160 disposed between the spool 158 and the rod 156, for biasing the spool 158 with a biasing force which varies with a change in the position of the rod 156, thereby changing the flow of the fluid from the port 154 to the drain port 155. The sensing valve 150 applies to the first and second pressure regulating valves 130, 132 a speed-ratio pressure Pe which increases with an increase in the speed ratio of the transmission 14. The upper and lower halves of the speed-ratio sensing valve 150 above and below its centerline as shown in FIG. 12, correspond to two different positions of the rod 156.

The first pressure regulating valve 130 is disposed between the first pressure line 50 and the second pressure line 52, and functions to regulate the first line pressure Pl1 by releasing a portion of the fluid from the first pressure line 50 to the second pressure line 52. The valve 130 includes: a valve spool 164 operable to control communication between an input port 161 and an output port 162, which communicate with the first and second pressure lines 50, 52, respectively; a spring 166 for biasing the spool 164 in a direction to disconnect the input and output ports 161, 162 from each other (to close the valve); and a plunger 168 which receives the previously indicated throttle pressure Pth, and transmits the received pressure Pth to the spool 164 in the direction to close the valve. The valve spool 164 has a pair of pressure-receiving surfaces 170, 172 which receive the speed-ratio pressure Pe and the first line pressure Pl1. The spool 164 is moved to a position at which a thrust force to close the valve 130 based on the speed-ratio pressure Pe and the first line pressure Pl1 acting on the pressure-receiving surfaces 170, 172 is equal to a thrust force to open the valve 130 based on the biasing force of the spring 166 and the throttle pressure $\theta$Pth transmitted from the plunger 168. In this arrangement, the first line pressure Pl1 is lowered with an increase in the speed-ratio pressure Pe, and is raised with an increase in the throttle pressure Pth. Thus, the first line pressure Pl1 is controlled based on a currently required output of the vehicle expressed in the form of the current position of the throttle valve, and on the actual speed ratio e of the continuously variable transmission 14, so that the first line pressure Pl1 is held at a minimum level necessary to provide a sufficient thrust force for establishing the determined target speed ratio e* of the transmission 14. The areas of the pressure-receiving surfaces 170, 172, the biasing force of the spring 166 and the pressure-receiving area of the plunger 168, are determined so as to control the first line pressure Pl1 as described above.

The second pressure regulating valve 132 is disposed between the second pressure line 52 and the drain line 60, for regulating the second line pressure Pl2 by releasing a portion of the fluid from the second pressure line 52 to the drain line 60. The second pressure regulating valve 132 includes: a valve spool 178 operable to control communication between an input port 174 and an output port 176, which communicate with the second pressure line 52 and the drain line 60, respectively; a spring 180 for biasing the spool 178 in a direction to disconnect the input and output ports 174, 176 from each other (to close the valve); and a plunger 182 which receives the throttle pressure Pth, and transmits the received pressure Pth to the spool 178 in the direction to close the valve. The valve spool 178 has a pair of pressure-receiving surfaces 184, 186 which receive the speed-ratio pressure Pe and the second line pressure Pl2. The spool 178 is moved to a position at which a thrust force to close the valve 132 based on the speed-ratio pressure Pe and the second line pressure Pl2 acting on the pressure-receiving surfaces 184, 186 is equal to a thrust force to open the valve 132 based on the biasing force of the spring 180 and the throttle pressure Pth transmitted from the plunger 182. In this arrangement, the second line pressure Pl2 is lowered with an increase in the speed-ratio pressure Pe, and is raised with an increase in the throttle pressure Pth. Thus, the second line pressure Pl2 is controlled based on the currently required output of the vehicle (current position of the throttle valve), and on the actual speed ratio e of the transmission 14, so that the second line pressure Pl2 is held at a minimum level necessary to provide a sufficient thrust for establishing a tension of the transmission belt 24 that prevents a slip of the belt on the pulleys 20, 22. The areas of the pressure-receiving surfaces 184, 186, the biasing force of the spring 180 and the pressure-receiving area of the plunger 182, are determined so as to control the second line pressure Pl2 as described above.

The second pressure line 52 is connected to the conduit 29 by the one-way by-pass line 112, which serves to apply the second line pressure Pl2 to the first cylinder 26 and thereby maintain the pressure Pin at the second line pressure Pl2, when the pressure Pin falls below the second line pressure Pl2. Similarly, the second pressure line 52 is connected to the conduit 30 by the one-way by-pass line 114, which serves to apply the second line pressure Pl2 to the second cylinder 28 and thereby maintain the pressure Pout at the second line pressure Pl2, when the pressure Pout falls below the second line pressure Pl2. The first and second cylinders 26, 28 are connected to restricted leak lines (not shown) for allowing restricted leakage flows of the fluid from the cylinders.

In the present embodiment, too, the one-way by-pass line 112, 116 prevent a slip of the transmission belt 24, due to an unexpected excessive leakage flow of the fluid from the cylinders. Further, the restricted leak flows from the cylinders 26, 28 through the leak lines eliminate a difference between the second line pressure pressure Pl2 established by the second pressure regulating valve 132, and the pressure Pin or Pout in the low-pressure cylinder 26 or 28 on the driven shaft.

Figure 13:
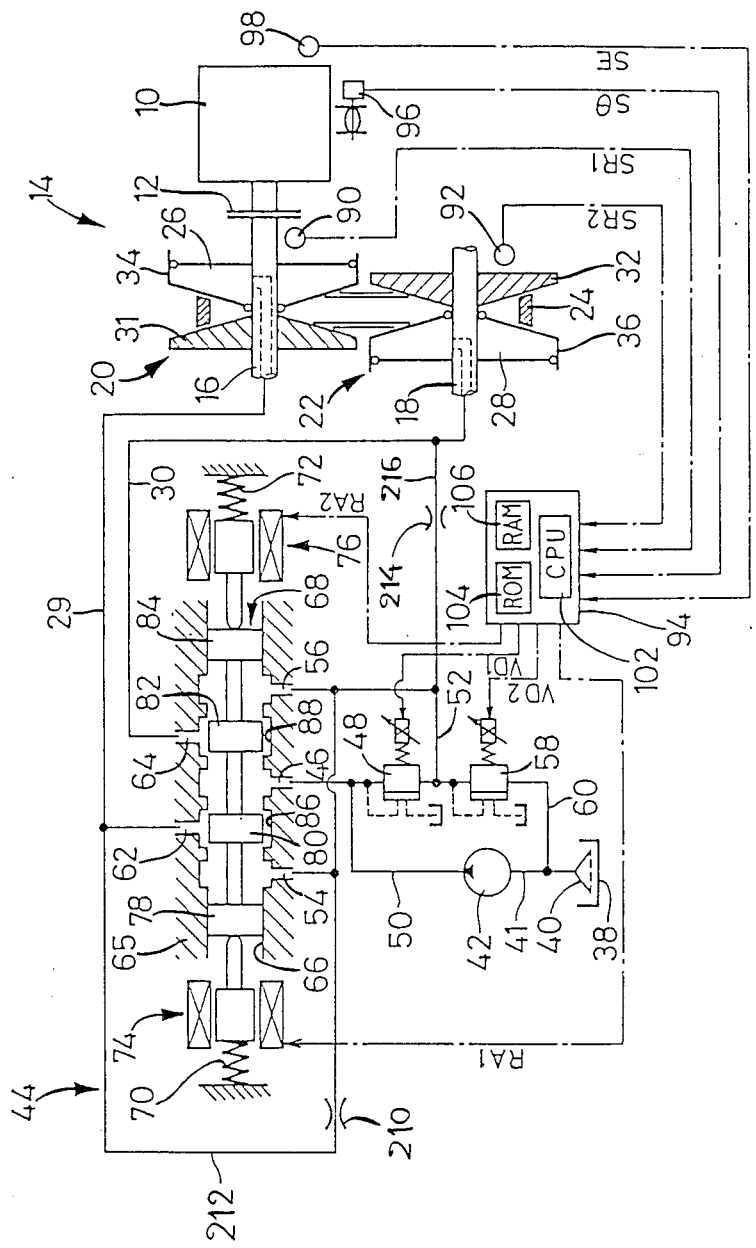
FIG. 13 is a schematic view corresponding to that of FIG. 1, illustrating a still further embodiment of the present invention.

A further embodiment is shown in FIG. 13, wherein a flow restrictor 210 is provided in a restricted by-pass line 212 connecting the second pressure line 52 and the first cylinder 26 (conduit 29), while a flow restrictor 214 is provided in a restricted by-pass line 212 connecting the second pressure line and the second cylinder 28 (conduit 30).

Figure 14:
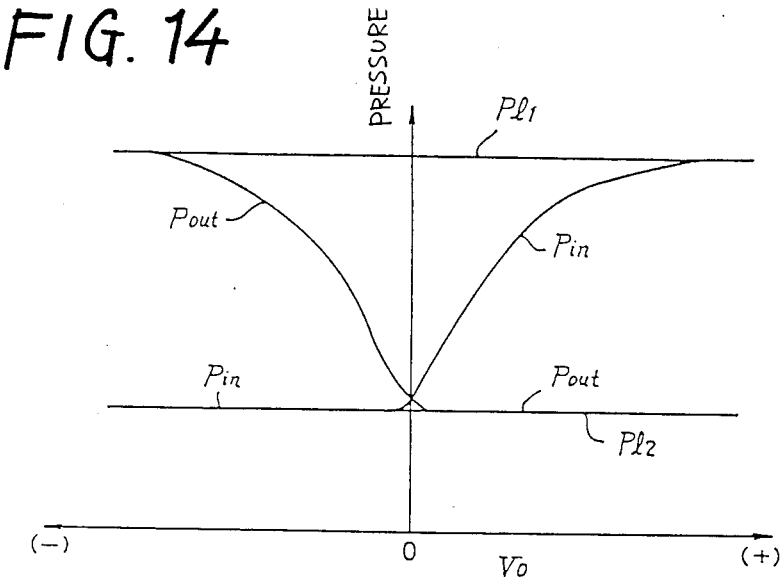
FIG. 14 is a view showing output characteristics of a shift-control valve used in the embodiment of FIG. 13.

In the present embodiment, the fluid in the high-pressure cylinder 26, 28 (provided on the drive shaft) may be fed to the second pressure line through the flow restrictor 212 or 216. According to this arrangement, the output pressures of the shift-control valve 44 (Pin in the first cylinder 26, and Pout in the second cylinder 28) is maintained at a level close to the second line pressure Pl2 when the valve spool 68 is placed in its neutral position, as indicated in FIG. 14. This output characteristics of the shift-control valve 44 is different from the output characteristics of FIG. 4 in the case where such restricted by-pass lines 212, 216 are not provided. Stated in more detail, the restricted by-pass lines 212, 216 allow restricted flows of the fluid from one of the two cylinders 26, 28 (i.e., low-pressure cylinder) to the second pressure line 52, when the first line pressure Pl1 of the first pressure line 50 is not applied to that one cylinder 26, 28. Thus, the pressures Pin and Pout are generally lowered in the arrangement of FIG. 14, as compared with the pressures Pin, Pout in the arrangement of FIG. 4. The restricted fluid flows through the flow restrictors 210, 214 are determined so that the low-pressure cylinder 26, 28 provides a sufficient tension of the transmission belt 24, while minimizing the power loss due to an unnecessarily high level of the pressure Pin or Pout in the low-pressure cylinder. In other words, the pressure Pin or Pout in the low-pressure cylinder 26, 28 on the driven shaft is made substantially equal to the second line pressure Pl2, and substantially no pressure difference ΔP2 (FIG. 4) is present between the pressure in the low-pressure cylinder and the second line pressure Pl2, when the valve spool 68 is in the neutral position.

Figure 2:
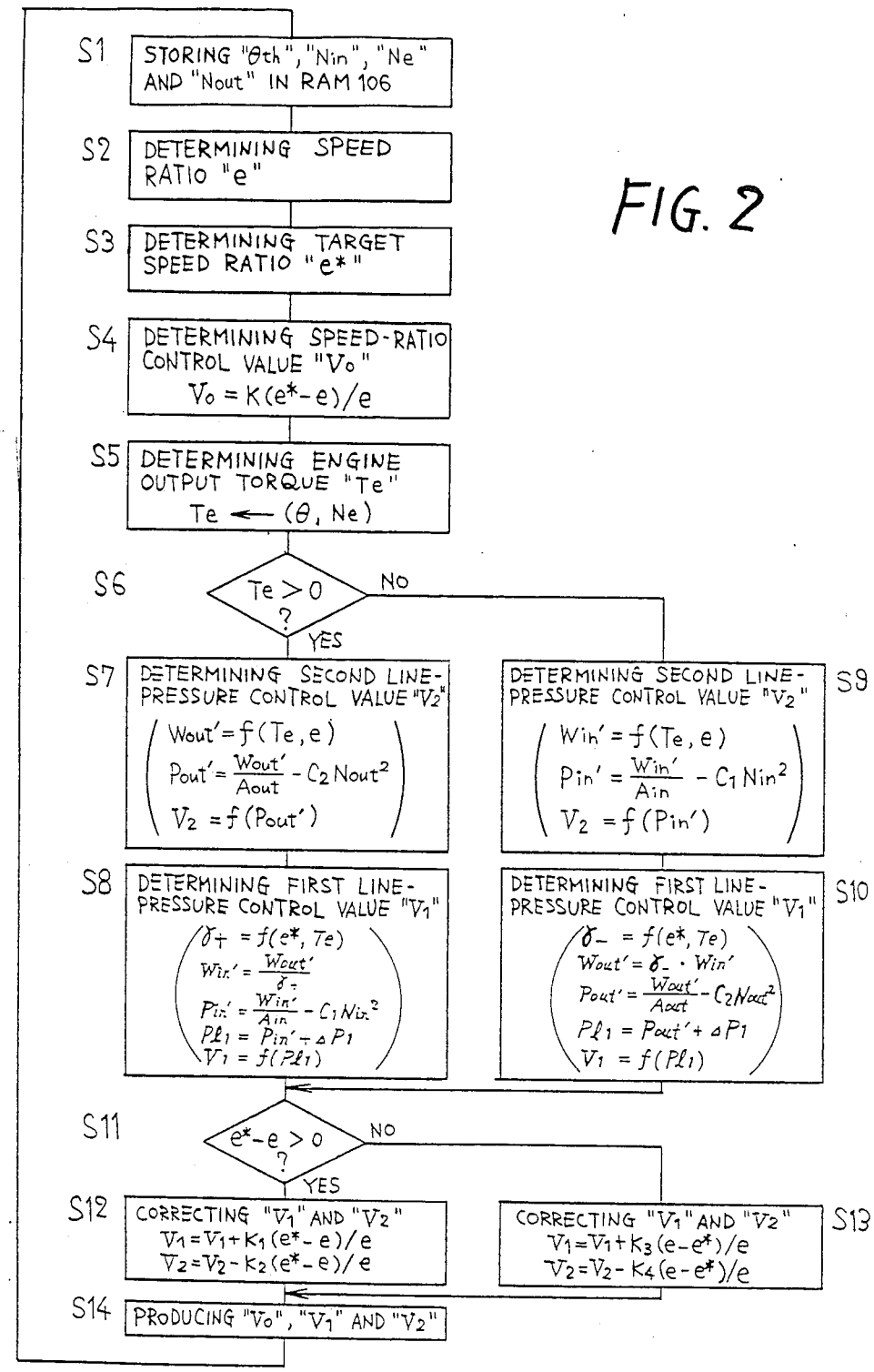
FIG. 2 is a flow chart illustrating an operation of the embodiment of FIG. 1.

The hydraulic control system of the present modified embodiment is operated according to the flow chart shown in FIG. 2, as previously described. Therefore, the embodiment of FIG. 13 has the same advantages as the first embodiment of FIG. 1. More specifically, the fluid flows through the restricted by-pass lines 212, 216 cause the pressures Pin and Pout (output pressures of the shift-control valve 44) to be maintained near the second line pressure Pl2 while the spool 68 is in the neutral position. Accordingly, there arises substantially no pressure difference (ΔP2 indicated in FIG. 4) between the second line pressure Pl2 established by the second pressure regulating valve 58, and the pressure Pin or Pout in the low-pressure cylinder 26, 28 while the shift-control valve 44 is placed near its neutral position. Hence, it is not necessary to calculate such a pressure difference by using an equation, and the control formulas for the second pressure regulating valve 58 are made simpler. Thus, the present embodiment does not suffer from control inaccuracy due to an error in the calculation of the pressure difference ΔP2, and eliminates the use of data map or equation for calculating the pressure difference ΔP2, and arithmetic operations to obtain the desired second line pressure by compensating for the calculated pressure difference.

Figure 16:
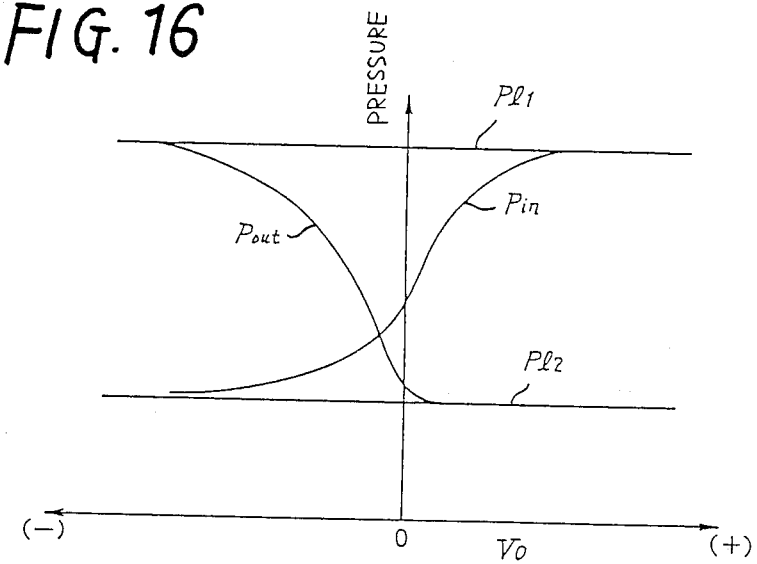
FIG. 16 is a view showing output characteristics of a shift-control valve of the embodiment of FIG. 15.
Figure 15:
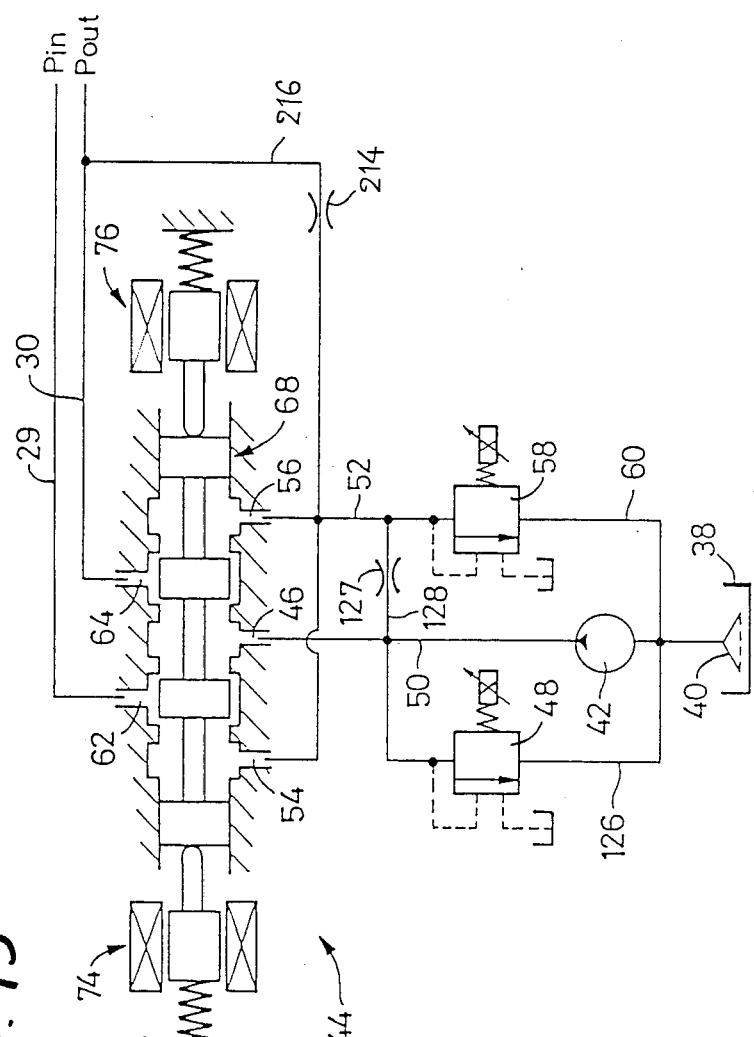
FIG. 15 is a fragmentary schematic view corresponding to that of FIG. 10, showing a yet further embodiment of the invention.

A still further modified hydraulic control system for the transmission 14 according to the present invention is illustrated in FIG. 15, wherein the first and second pressure regulating valves 48, 58 are disposed at the same positions in the hydraulic system as in the embodiment of FIG. 10. In the instant embodiment, the restricted by-pass line 216 is provided, connecting the second pressure line 52 and the conduit 30. According to this arrangement, the pressure Pout in the second cylinder 28 is generally made lower (pressure curve Pout has a comparatively small gradient), and the lower limit of the pressure Pout is maintained at the level of the second line pressure Pl2, near the neutral position of the valve spool 68, as shown in FIG. 16. Although the control error in relation to the pressure difference $\Delta P2$ is relatively large in the negative range of the control value Vo (while in the engine-brake state of the vehicle), the value $\Delta Vo$ is held extremely small in the positive range of the control value Vo (while in the positive-torque state), as in the preceding embodiment of FIG. 13.

Figure 17:
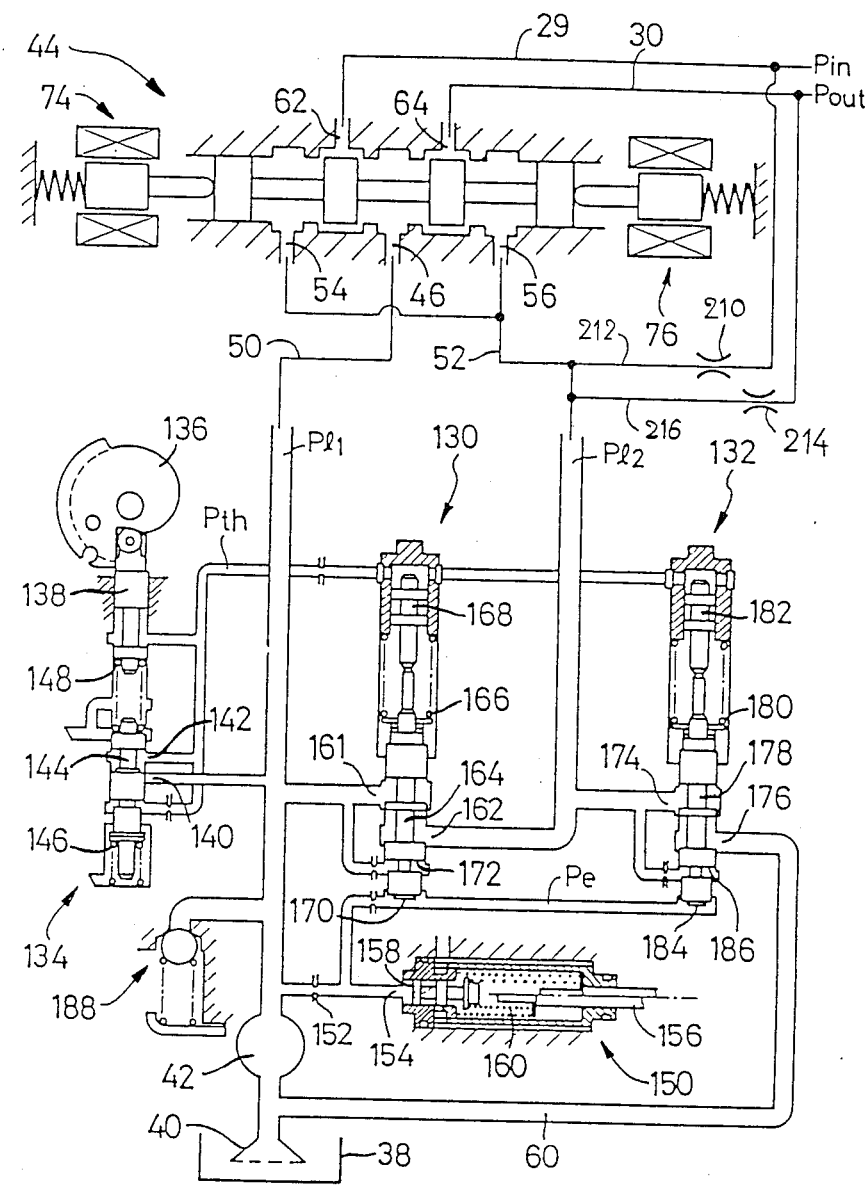
FIG. 17 is a fragmentary schematic view illustrating another embodiment of the invention.

Referring next to FIG. 17, there is shown yet another modified hydraulic control system wherein hydraulically controlled first and second pressure regulating valves 130, 132 are used, in place of the solenoid-operated pressure regulating valves 48, 58, as in the embodiment of FIG. 12. In this embodiment, the second pressure line 52 and the conduit 29 are connected by the first restricted by-pass line 212 provided with the flow restrictor 210. Similarly, the second pressure line 52 and the conduit 30 are connected by the second restricted by-pass line 216 provided with the flow restrictor 214. In this case, too, the restricted by-pass lines 212, 216 cause the shift-control valve 44 to provide the output characteristics as shown in FIG. 3. Therefore, the pressure Pin or Pout in the low-pressure cylinder (on the driven shaft) can be exactly controlled as desired, with a relatively simple hydraulic circuit for controlling the second pressure regulating valve 132.

Figure 18:
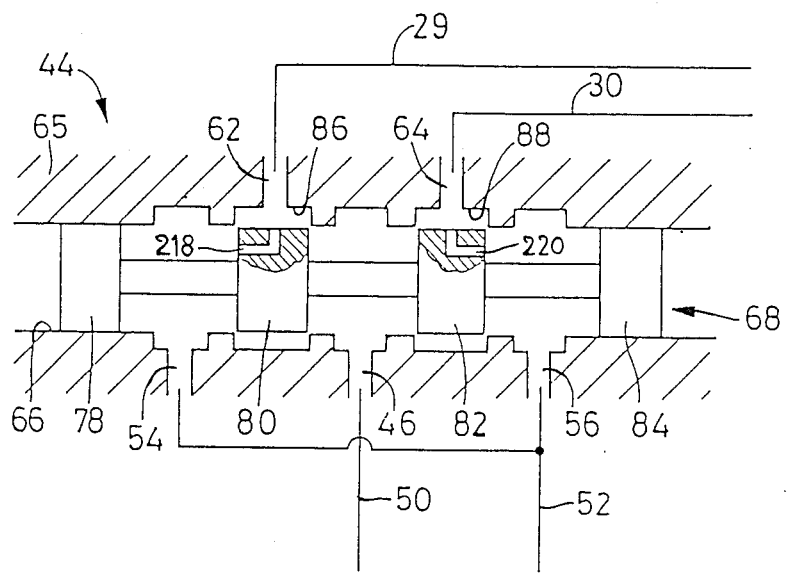
FIGS. 18, 19 and 20 are fragmentary views representing still further embodiments of the present invention.
Figure 19:
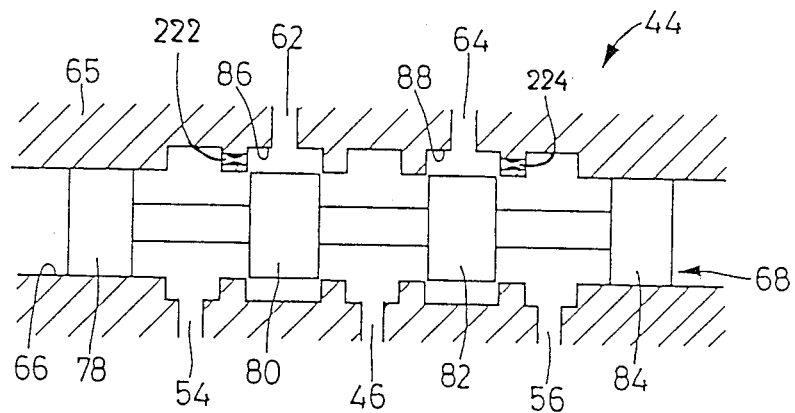
Figure 20:
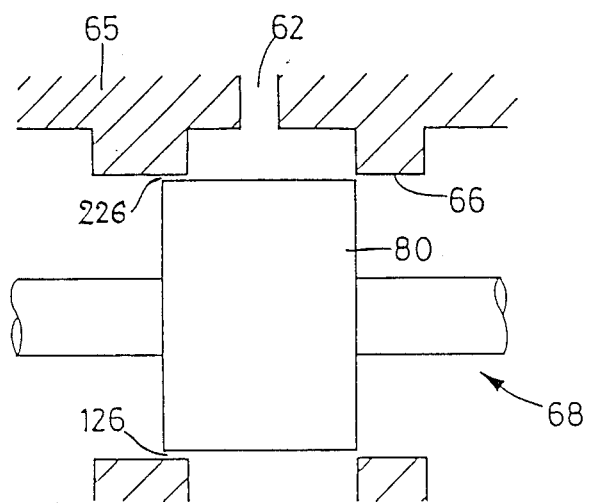

The restricted by-pass lines 212, 216 provided in the preceding embodiments may be replaced by restrictor passages 218, 220 of FIG. 18, restrictor passages 222, 224 of FIG. 19, or a restrictor 226 of FIG. 20. The restrictor passages 218, 220 shown in FIG. 18 are formed through the lands 80, 82 of the valve spool 68. That is, the lands 80, 82 also function as flow restrictors. The restrictor passages 222, 224 shown in FIG. 19 are formed through portions of the valve body 65 which define the bore 66. The restrictor 226 shown in FIG. 20 is constituted by the valve spool 68 and the valve body 65, in the form of a radial clearance between the land 80, 82, and the inner surface defining the bore 66.

While the present invention has been described in its preferred embodiments, referring to the accompanying drawings, the invention may be otherwise embodied.

For example, the first pressure regulating valve 48, 132 used in the illustrated embodiments for regulating the output pressure of the pump 42 into the first line pressure Pl1, may be eliminated. In this case, the pressure generated by the pump 42 is directly applied as the first line pressure to the input port 46 of the shift-control valve 44.

In the embodiments of FIGS. 1 and 10, etc., the restricted leak lines 122, 124 are provided to allow the fluid to leak from the first and second cylinders at comparatively low rates. However, these leak lines 122, 124 may be eliminated, since the variable-width pulleys 20, 22 and the hydraulic cylinders 26, 28 have sliding portions which inherently allow the fluid to leak. It is noted that even if the leak flows from the cylinders through such leak lines or sliding portions are not present, the use of a by-pass line or lines connecting the second pressure line 52 to one or both of the cylinders 26, 28 is effective in preventing a slip of the transmission belt 24, and consequent deterioration of the durability of the transmission 14.

Further, the restricted leak line 122 connected to the first cylinder 26 may have a reduced degree of flow restriction than the leak line 124 connected to the second cylinder 28. In this case, the shift-control valve 44 provide the output characteristics which is intermediate between that of FIG. 3 and that of FIG. 11.

Moreover, the shift-control valve 44 may be operated by pilot pressures supplied from respective pilot solenoid valves, and the valve spool 68 may be replaced by a plurality of spools.

Although the restricted by-pass lines 212, 216 incorporate the flow restrictors 210, 214, these flow restrictors may be eliminated if the by-pass lines 212, 216 themselves are restricted passages with a diameter small enough to provide a suitable flow resistance.

It is to be understood that the invention is not limited to the details of the illustrated embodiments, but various other changes and modifications may be made in the invention, without departing from the spirit and scope of the invention defined in the following claims.

What is claimed is:

1. A hydraulic control system for a continuously variable transmission of a belt-and-pulley type for an automotive vehicle, the transmission having a first and a second shaft, a first and a second variable-diameter pulley provided on the first and second shafts, respectively, a transmission belt connecting the first and second pulleys to transmit power from one of the pulleys to the other, and a first and a second hydraulic cylinder for changing effective diameters of the first and second pulleys, said hydraulic control system comprising:

a hydraulic pressure source for pressurizing a working fluid;

a shift-control valve receiving a first line pressure from said pressure source through a first pressure line, and applying said first line pressure to one of said first and second hydraulic cylinders, while simultaneously permitting a flow of the fluid from the other hydraulic cylinder, thereby changing the effective diameters of said first and second pulleys to control a speed ratio of said transmission;

a second pressure line connected to said shift-control valve to receive therefrom a pressure of the fluid flowing from said other hydraulic cylinder;

a pressure regulating valve for regulating the pressure in said second pressure line, as a second line pressure lower than said first pressure; and at least one restricted by-pass line connecting said second pressure line to at least one of said first and second hydraulic cylinders, respectively, said at least one restricted by-pass line permitting a restricted flow between said second pressure line and said at least one hydraulic cylinder.

2. A hydraulic control system according to claim 1, wherein said shift-control valve comprises a valve body having a bore, and a valve spool slidably received within said bore, said at least one restricted by-pass line being formed in said valve body.

3. A hydraulic control system according to claim 1, wherein said shift-control valve comprises a valve body having a bore, and a valve spool slidably received within said bore, said at least one restricted by-pass line being formed in said valve spool.

4. A hydraulic control system according to claim 1, wherein said shift-control valve comprises a valve body having a bore, and a valve spool slidably received within said bore, each of said at least one restricted by-pass line consists of a restrictor in the form of a radial clearance between said valve spool and a surface of said valve body defining said bore.

* * * * *